United States Patent
McManus et al.

(10) Patent No.: US 6,696,813 B2
(45) Date of Patent: Feb. 24, 2004

(54) OPEN-LOOP SYNCHRONIZER FOR A SLIDE OUT ROOM

(75) Inventors: Patrick W. McManus, Osceola, IN (US); Martin P. McManus, Mishawaka, IN (US)

(73) Assignee: VT Holdings, II, Inc., Reno, NV (US)

(*) Notice: Subject to any disclaimer, the term of this patent is extended or adjusted under 35 U.S.C. 154(b) by 42 days.

(21) Appl. No.: 09/995,146

(22) Filed: Nov. 27, 2001

(65) Prior Publication Data

US 2002/0070700 A1 Jun. 13, 2002

Related U.S. Application Data

(60) Provisional application No. 60/253,253, filed on Nov. 27, 2000.

(51) Int. Cl.⁷ .................................................. H02D 1/46
(52) U.S. Cl. ...................... 318/700; 318/696; 318/632; 318/611; 318/758; 318/449
(58) Field of Search .......................... 296/26; 318/696, 318/632, 611, 758, 560, 567, 445, 449, 466, 468, 473, 705, 700, 34, 85; 388/825

(56) References Cited

U.S. PATENT DOCUMENTS

| | | | |
|---|---|---|---|
| 2,831,722 A | | 4/1958 | Hanson et al. |
| 4,157,571 A | * | 6/1979 | Shu ................................. 360/8 |
| 4,254,439 A | * | 3/1981 | Fowler et al. ............... 358/410 |
| 4,651,073 A | * | 3/1987 | Shimizu et al. ............. 318/632 |
| 4,797,831 A | | 1/1989 | Dressing et al. |
| 4,938,160 A | * | 7/1990 | Nakanura et al. ........... 112/275 |
| 5,295,430 A | | 3/1994 | Dewald, Jr. et al. |
| 5,332,276 A | | 7/1994 | Blodgett, Jr. |
| 5,800,002 A | | 9/1998 | Tiedge et al. |
| 5,857,733 A | | 1/1999 | Dewald, Jr. et al. |
| 5,915,774 A | | 6/1999 | Tiedge |
| 6,052,952 A | | 4/2000 | Frerichs et al. |
| 6,118,945 A | * | 9/2000 | Tanaka .......................... 396/79 |
| 6,230,078 B1 | * | 5/2001 | Ruff ............................ 700/247 |

FOREIGN PATENT DOCUMENTS

CA            2136673           3/1996

\* cited by examiner

*Primary Examiner*—Karen Masih
(74) *Attorney, Agent, or Firm*—Baker & Daniels

(57) ABSTRACT

An open-loop system for synchronizing movement of a slide out room includes a pair of motors connected to extendable members which support the room during movement between an extended and a retracted position for driving the extendable members, a controller connected to the motors, and a plurality of switches connected to the controller for permitting operator control of the system. The controller provides synchronized output signals to the motors which have known output characteristics depending upon the motor inputs. The controller thus ensures the motors move substantially in unison without requiring feedback from the motors or the extendable members. The system may be initialized to establish stop positions of the extendable members which are stored in the controller.

13 Claims, 11 Drawing Sheets

OPEN-LOOP SYNCHRONIZER FOR A SLIDE OUT ROOM

This application claims the benefit of U.S. Provisional Patent Application Ser. No. 60/253,253 filed Nov. 27, 2000, the complete disclosure of which is hereby expressly incorporated by reference.

BACKGROUND OF THE INVENTION

Field of the Invention

This invention relates to an open-loop mechanism for controlling the actuation of a slide out room used on mobile living quarters (such as a recreational vehicle).

DISCUSSION OF THE PRIOR ART

The width of mobile living quarters, such as recreational vehicles, is limited to that which may be accommodated for travel on the highways. Accordingly, when the mobile living quarters is parked for use, it is desirable to be able to expand the living quarters, to increase the available living area. Slide out rooms have become popular to effect expansion of the available living area of such mobile living quarters. These slide out rooms are retracted into the main living area when the vehicle is moved during travel, and extended from the main living quarters to provide additional living space when the mobile living quarters is parked for use. Slide out rooms are typically mounted on telescoping tubes which are mounted on the frame supporting the main living area, and are actuated by hydraulic rams, electric motors, or similar actuation devices. Typically, two or more such actuation devices are required. Slide out rooms are only semi-rigid. Furthermore, the two or more actuators are often not symmetrically located with respect to the slide out room, because placement of the actuators must accommodate wheel wells and other structural components of the mobile living quarters. It is thus desirable to synchronize operation of the actuators. It is also desirable to be able to control the "room out" and "room in" positions for the actuators to assure that the room is fully extended across its entire length when the room is extended for use, and to assure that it is fully retracted across its entire length when the room is retracted to permit the mobile living quarters to be moved. Failure to fully extend or fully retract the slide out room across its entire length may permit gaps to occur between the seals that seal the slide out room to the main living quarters, thus permitting moisture to leak into the unit. Failure to synchronize properly the motion of the actuators may cause undesirable deflection across the length of the room, again resulting in damage to the room or the vehicle, seal problems, and unsightly appearance of the room.

SUMMARY OF THE INVENTION

The present invention provides an open-loop synchronization system for a slide out room which synchronizes movement of the room during extension and retraction of the room without using position feedback from the extendable members supporting the room or the motors driving the extendable members. The motors used have known output characteristics which depend upon the motor input. The controller provides synchronized output signals to the motors to cause synchronized movement of the motors, and therefore synchronized movement of the extendable members. The "in" stop and "out" stop positions of the extendable members may be set during initialization of the system, and stored by the controller. Accordingly, by comparing the output signals provided to the motors during extension and retraction to the stored data corresponding to desired "in" and "out" stop positions, the system automatically stops the motors when the stop positions are reached, without feedback.

In another embodiment of the invention, stop devices which provide feedback to controller (or the operator) are used. In this embodiment, only open-loop synchronization of the motors is provided.

BRIEF DESCRIPTION OF THE DRAWINGS

These and other advantages of the present invention will become apparent from the following description, with reference to the accompanying drawings, in which.

DETAILED DESCRIPTION OF EMBODIMENTS OF THE INVENTION

The embodiments of the invention described herein are not intended to be exhaustive or to limit the invention to the precise forms disclosed. Rather, the embodiments selected for description have been chosen to enable one skilled in the art to practice the invention.

Much of the description of the present invention relates to the description presented in U.S. patent application Ser. No. 09/411,019, filed Oct. 1, 1999, which is incorporated herein by reference. The concept of synchronizing the operation of extendable members used to move a slide out room between an extended and a retracted position, described in the above-referenced patent application, is relevant to the present invention in that synchronized movement of extendable members is also accomplished. The prior invention of the above-referenced application, however, synchronizes extendable member movement by providing a controller which controls movement of the extendable members based on feedback from position sensors which corresponds to the current positions of the extendable members. The present invention, on the other hand, synchronizes movement of extendable members without receiving feedback indicating the position of the extendable members. Instead, the controller of the present invention is provided with sufficient intelligence to simultaneously operate the extendable members to ensure synchronized movement thereof. Some embodiments of the invention described below also include the concept of stopping the extendable members at specific "in" stop and "out" stop locations, without using feedback indicating the position of the extendable members. Other embodiments provide synchronous movement of the extendable members without feedback, but use feedback of some kind to determine when the extendable members have reached predetermined "in" and "out" stop positions, and stop the extendable members in response to that feedback.

Figure 1:
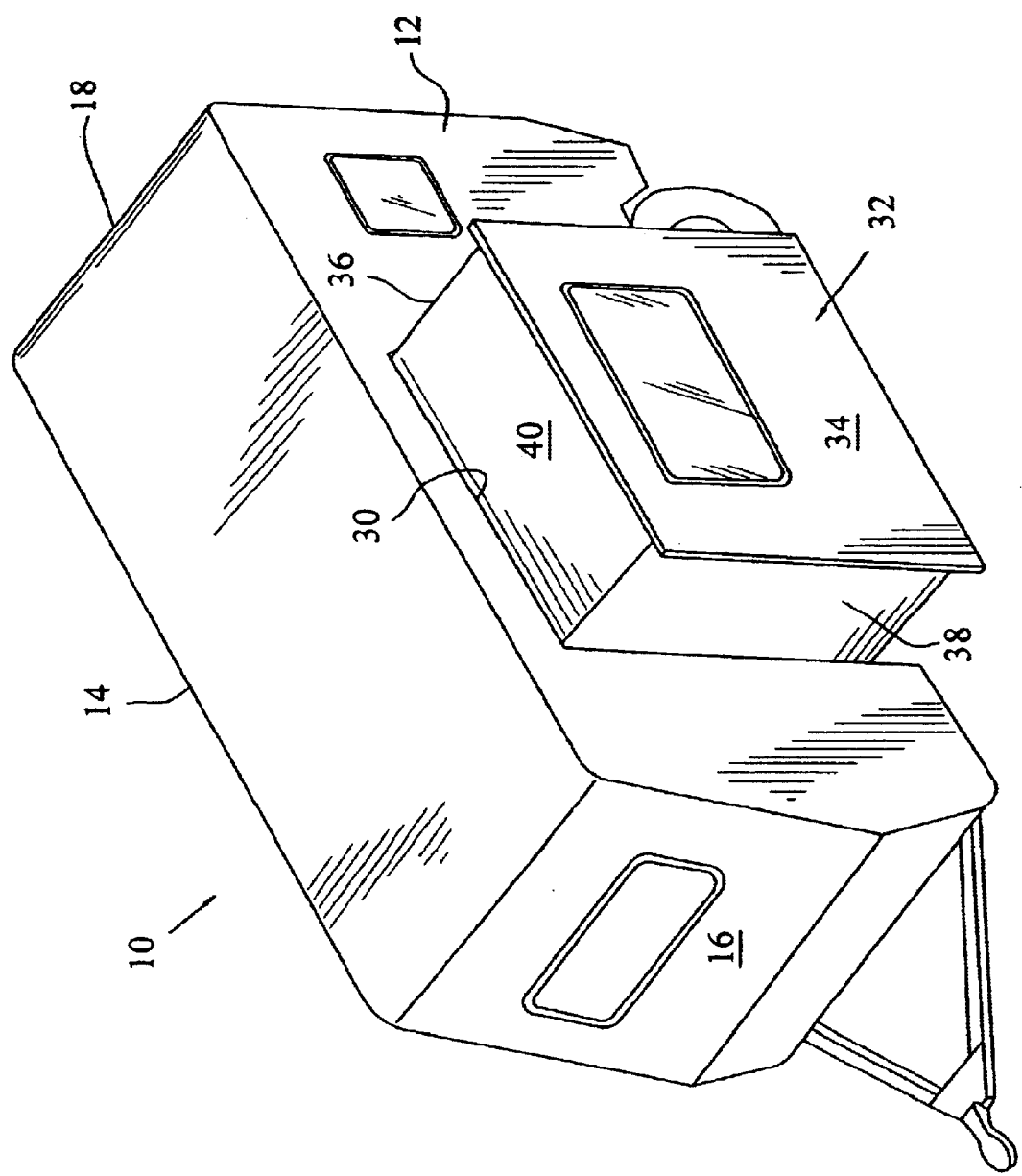
FIG. 1 is a perspective view of a recreational vehicle having a slide out room.
Figure 2:
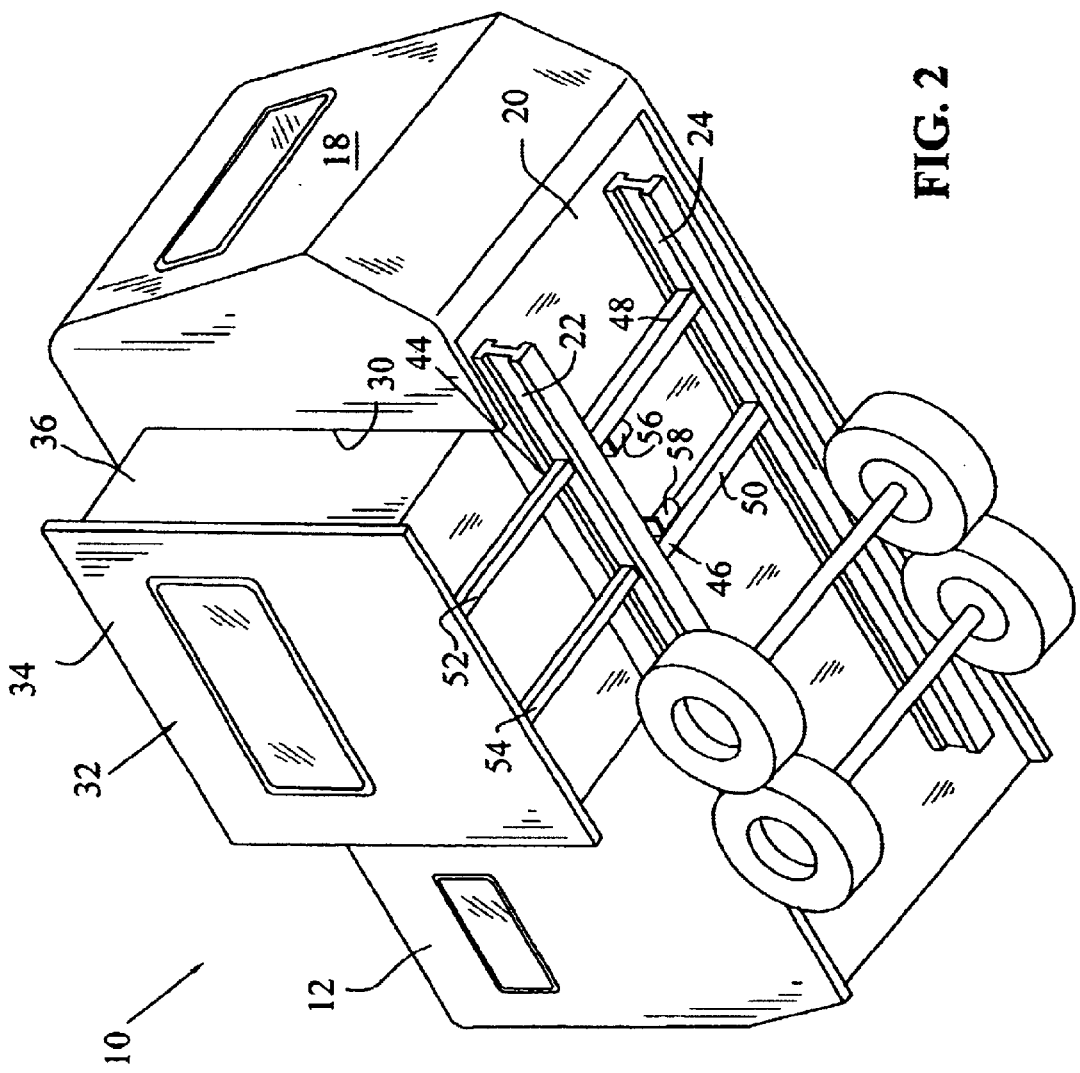
FIG. 2 is another perspective view of the vehicle and room of FIG. 1.

Referring now to FIGS. 1 and 2, mobile living quarters, such as a recreational vehicle, is generally indicated by the numeral 10 and includes side walls 12, 14, end walls 16, 18, and a floor 20 (FIG. 2) which is supported on a frame including a pair of longitudinally extending main frame members 22, 24.

Side wall 12 of mobile living quarters 10 includes a large opening 30 which slidably receives a slide out room generally indicated by the numeral 32, which is mounted to vehicle 10 for movement relative to side wall 12 between an extended position illustrated in FIGS. 1 and 2, wherein slide out room 32 is extended to provide auxiliary living space, and a retracted position retracted within mobile living quarters 10 for travel. Slide out room 32 includes a back wall 34 which is substantially flush with side wall 12 when room 32 is in the retracted position. Slide out room 32 also includes side walls 36, 38, a ceiling 40, and a floor 42. The lower portion of back wall 34 extends below the lower surface of floor 42.

Slide out room 32 is guided for movement between the extended and retracted positions by a pair of extendable members 44, 46. Each member 44, 46 includes an outer tube 48, 50 which is secured to frame members 22, 24 and extends through openings formed therein. Outer tubes 48, 50 telescopically receive corresponding inner tubes 52, 54, each of which is secured to the portion of back wall 34 which extends below the lower surface of floor 42 as described above. Slide out room 32 may be moved between the extended and retracted positions by electric motor drives including a pair of electric motors 56, 58. While the specific embodiments described herein are shown below floor 20, it should be appreciated that this invention is also usable either in the floor or above the floor.

Figure 3:
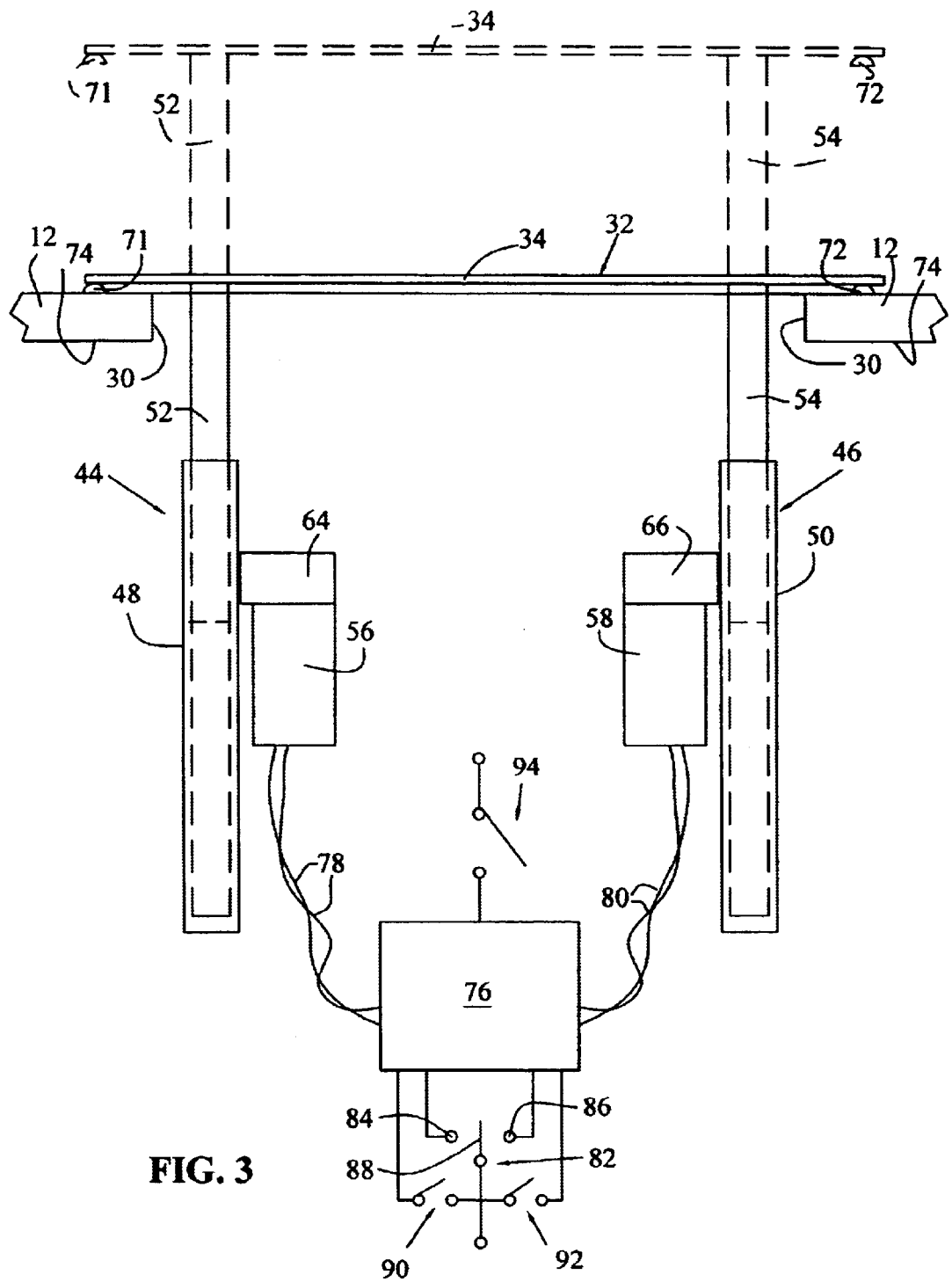
FIG. 3 is a conceptual, partially schematic, top plan view of portions of the vehicle and room of FIGS. 1 and 2, showing the room in both the extended and retracted positions.

Referring now to FIG. 3, portions of room 32 are shown both in the retracted position (solid lines) and the extended position (dotted lines). As shown, motor 56 is mounted adjacent left outer tube 48 and motor 58 is mounted adjacent right outer tube 50. Motor 56 causes movement of inner tube 52 relative to outer tube 48 through a gear box 64. Similarly, motor 58 drives inner tube 54 through a gear box 66. Gear boxes 64, 66 may include pinion gears (not shown) for driving racks (not shown) mounted to inner tubes 52, 54. Alternatively, gear boxes 64, 66 may include internally threaded gears (not shown) for meshing with the external threads of a threaded shaft or worm gear (not shown) connected to inner tubes 52, 54. Any of a variety of conventional methods may be used wherein operation of motors 56, 58 results in the extension or retraction of inner tubes 52, 54. As such, gear boxes 64, 66 are shown generically in FIG. 3.

FIG. 3 shows room 32 (in solid lines) in the retracted position, wherein back wall 34 is substantially flush with vehicle side wall 12. When room 32 is properly positioned in the retracted position, inner tube 52 is retracted into outer tube 48 to a left "in" stop position such that a bulb seal 71 is compressed between back wall 34 and side wall 12 on the left side of room 32, as viewed in FIG. 3, and inner tube 54 is retracted into outer tube 50 to a right "in" stop position such that a bulb seal 72 is similarly compressed on the right side of room 32. FIG. 3 also shows room 32 (in dotted lines) in the extended position. When room 32 is properly position in the extended position, a fascia (not shown) which extends perpendicularly from side walls 36, 38 and ceiling 40 engages the inner surface 74 of vehicle side wall 12. This fascia carries seals (not shown) similar to seals 71, 72 to prevent moisture and other elements from entering vehicle 10 when room 32 is in the extended position. When inner tube 52 is in the left "out" stop position (as shown in dotted lines in FIG. 3), the left portion of room 32 is properly sealed. Similarly, when inner tube 54 is in the right "out" stop position, the right portion of room 32 is properly sealed.

Motors 56, 58 are connected to a controller 76 by wires 78, 80 respectively. A main control switch 82, also connected to controller 76, is a three-position switch having an "in" terminal 84 connected to controller 74, an "out" terminal 86 connected to controller 74, and a neutral position between "in" terminal 84 and "out" terminal 86. When the switch arm 88 of control switch 82 is moved to engage "in" terminal 84, controller 74 causes motors 56, 58 to retract room 32 as will be further described below. When switch arm 88 is moved to engage "out" terminal 86, controller 74 causes motors 56, 58 to extend room 32 as will also be further described below.

A left override switch 90 and a right override switch 92 are also connected to controller 74. Switches 90, 92 are generally mounted such that they are not readily accessible during normal use of vehicle 10. It is contemplated that a service person would access switches 90, 92 during installation or adjustment of room 32. When left override switch 90 is actuated, operation of control switch 82 causes inward or outward movement of inner tube 52 only. Likewise, when right override switch 92 is actuated, control switch 82 controls the movement of inner tube 54, while inner tube 52 remains stationary.

Additionally, a set switch 94, also typically concealed during normal operation, is connected to controller 74 as shown in FIG. 3. Under certain circumstances as fully set forth below, actuation of set switch 94 provides an input to controller 74 which controller 74 interprets as a command to memorize a system parameter corresponding to the position of one or both of inner tubes 52, 54.

Motors 56, 58 are described herein as stepper motors. It should be clearly understood, however, that one of ordinary skill in the art could readily adapt the teachings of the present invention to a system using motors, other than stepper motors, which respond in a predictable manner to a particular input signal. For example, rotary motors which complete a predetermined number of revolutions in response to an input signal having a particular voltage or current level could be employed. The response of such motors may also depend upon the duration of the presence of a particular input signal having a constant or variable magnitude. Each such motor exhibits known output characteristics for a particular input signal.

It should also be understood that motors 56, 58 may be provided with integral brakes which engage and lock when the motor is disabled. This feature may be desirable to avoid "drift" of room 32 after being positioned into either the extended or retracted position. For example, if no such brakes are provided, room 32 may move out of the retracted position when vehicle 10 is traveling on a highway.

Figure 4:
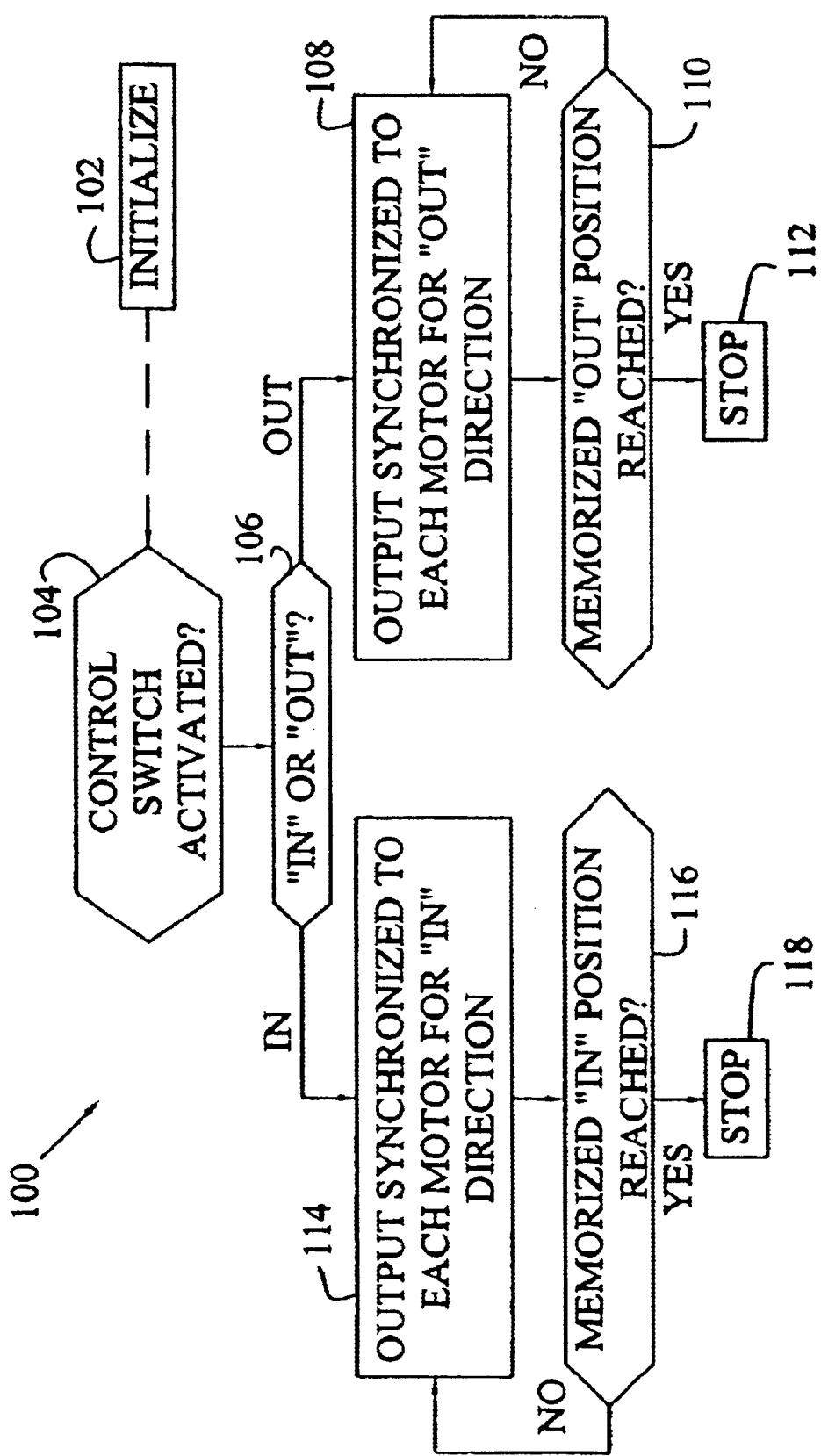
FIG. 4 is a flow diagram of the operation of one embodiment of the present invention.

FIG. 4 is a flow diagram of the operation of one embodiment of a system 100 according to the present invention. After the system is initialized as indicated by block 102 (further described below), controller 74 waits for input from control switch 82 as indicated by block 104. When an operator actuates control switch 82, an input is present at controller 74 corresponding to a command to move room 32 in the "in" direction (if switch arm 88 is moved to contact "in" terminal 84) or in the "out" direction (if switch arm 88 is moved to contact "out" terminal 86). Controller 74 determines at block 106 whether the "in" or the "out" direction is desired by the operator. Assuming, for purposes of explanation, that the operator selected the "out" direction to move room 32 toward the extended position, controller 74 outputs a synchronized signal to both of motors 56, 58 causing the motors to extend inner tubes 52, 54. If stepper motors are used, controller 74 simultaneously outputs a series of output signals to motors 56, 58 to cause the motors to move a predetermined number of counts or steps. Since motors 56, 58 are simultaneously operated by controller 74 and each result in the same, known distance of travel of their corresponding inner tube 52, 54, the movement of inner tubes 52, 54 is synchronized even though controller 74 does not receive a feedback signal from extendable members 44, 46 indicating the current positions of the members. Block 108 of FIG. 3 indicates the operation of controller 74 providing a synchronized output signal to motors 56, 58 to cause simultaneous outward movement of inner tubes 52, 54.

While controller 74 controls the operation of motors 56, 58 as described above, controller 74 also compares the total output signal (in terms of current flow reversals, counts, level, duration, etc.) provided to motors 56, 58 to the output signal required to cause extendable members 44, 46 to reach their predetermined "out" stop positions. The process for setting these "out" stop positions will be described below. The comparison of the output signal to the data stored in controller 74 corresponding to the "out" stop positions is indicated by block 110. If the output signal thus provided to motors 56, 58 does not yet correspond to the signal required for extendable members 44, 46 to reach their "out" stop positions, controller 74 continues to provide synchronized output signals to motors 56, 58. If, on the other hand, the previously determined "out" stop position of extendable members 44, 46 is reached (the memorized "out" stop position), then controller 74 stops providing output signals to motors 56, 58 as indicated by block 112. As should be apparent from the drawing, the same procedure is followed (blocks 114, 116, 118) when the operator moves room 32 in the "in" direction toward the retracted position.

Figure 5:
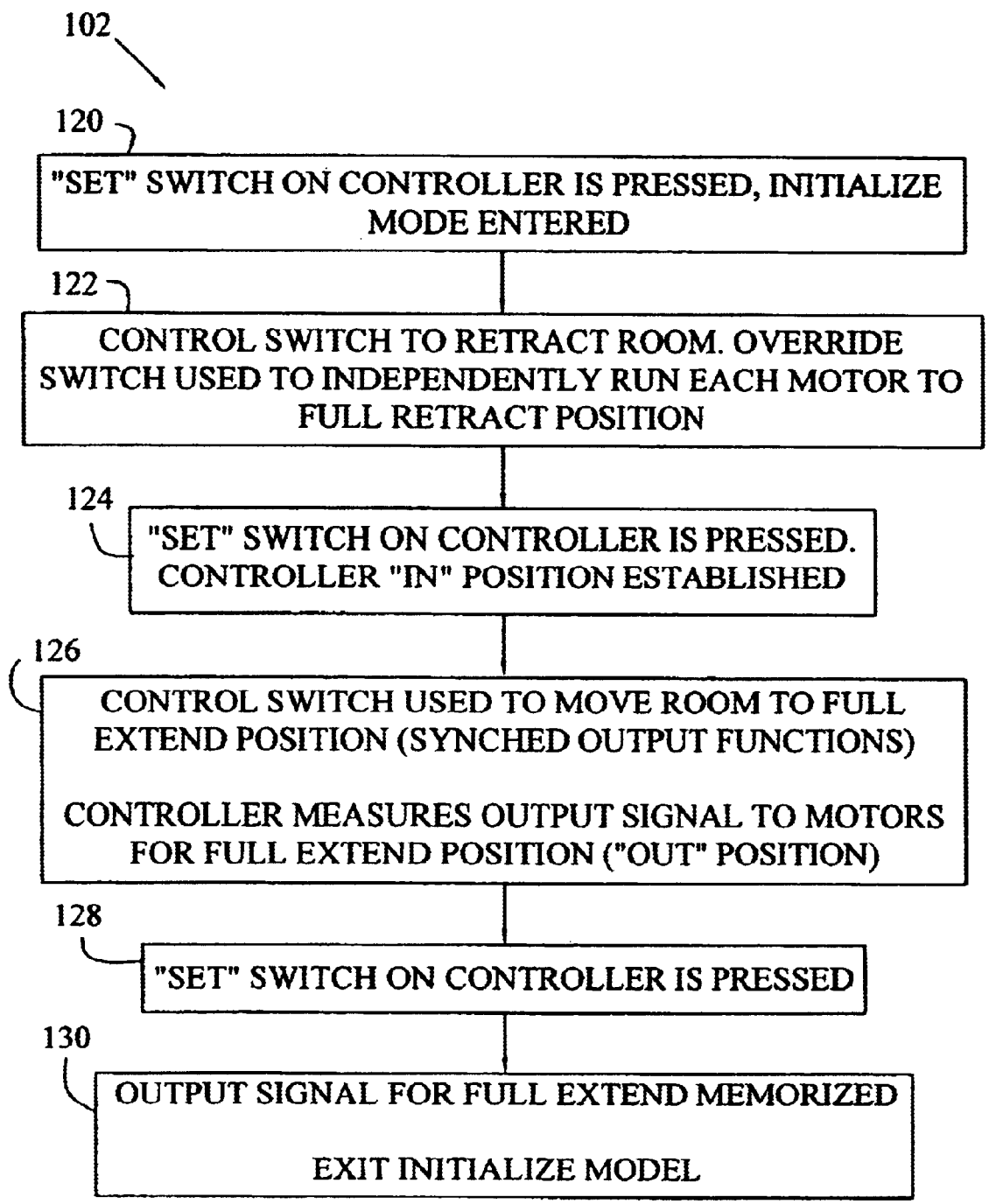
FIG. 5 is a flow diagram of an initialization procedure for the embodiment of FIG. 4.

FIG. 5 illustrates the procedure for initializing system 100 of FIG. 4. Controller 74 is designed to recognize an input from set switch 94 as a command to enter an initialization mode. Accordingly, when room 32 is installed in vehicle 10, for example, a technician may actuate set switch 94 to initialize system 100 as indicated by block 120. As indicated by block 122, the operator next uses control switch 82 to move room 32 toward the retracted position. The operator also uses a combination of control switch 82 and override switches 90, 92 to move the left and right sides of room 32 such that back wall 34 is parallel to vehicle side wall 12, and seals 71, 72 are properly compressed to provide an adequate seal. After each motor 56, 58 is independently operated using override switches 90, 92 in this manner, the operator again taps set switch 94 as indicated by block 124. Controller 74 stores this "in" position by storing data corresponding to an initial condition of motors 56, 58. If stepper motors are used, controller 74 treats the "in" position recorded by the second actuation of set switch 94 as corresponding to, for example, zero steps. Future control signals from controller 74 to motors 56, 58 will be referenced to this set of stored initial conditions.

With the "in" position established, the operator next moves control switch 82 such that switch arm 88 contacts "out" terminal 86 to move room 32 toward the extended position as indicated by block 126. Controller 74 responds by providing synchronized (or non-synchronized) output signals to motors 56, 58 as described above. Accordingly, inner tubes 52, 54 may move simultaneously outwardly from outer tubes 48, 50, thereby avoiding the damage to system 100, room 32, or vehicle 10 that may be caused by unsynchronized movement of extendable members 44, 46. During this outward extension of extendable members 44, 46, controller 74 measures the output signal (or counts the number of output signals) provided to motors 56, 58. Eventually, the operator releases control switch 82 when room 32 reaches the extended position.

As shown in blocks 128 and 130, when the extended position is reached, the operator again taps set switch 94, and controller 74 stores the output signal data (i.e., the number of steps from the previously-stored "in" position) corresponding to the "out" position. After the "out" position is memorized, controller 74 exits the initialization mode.

Figure 6:
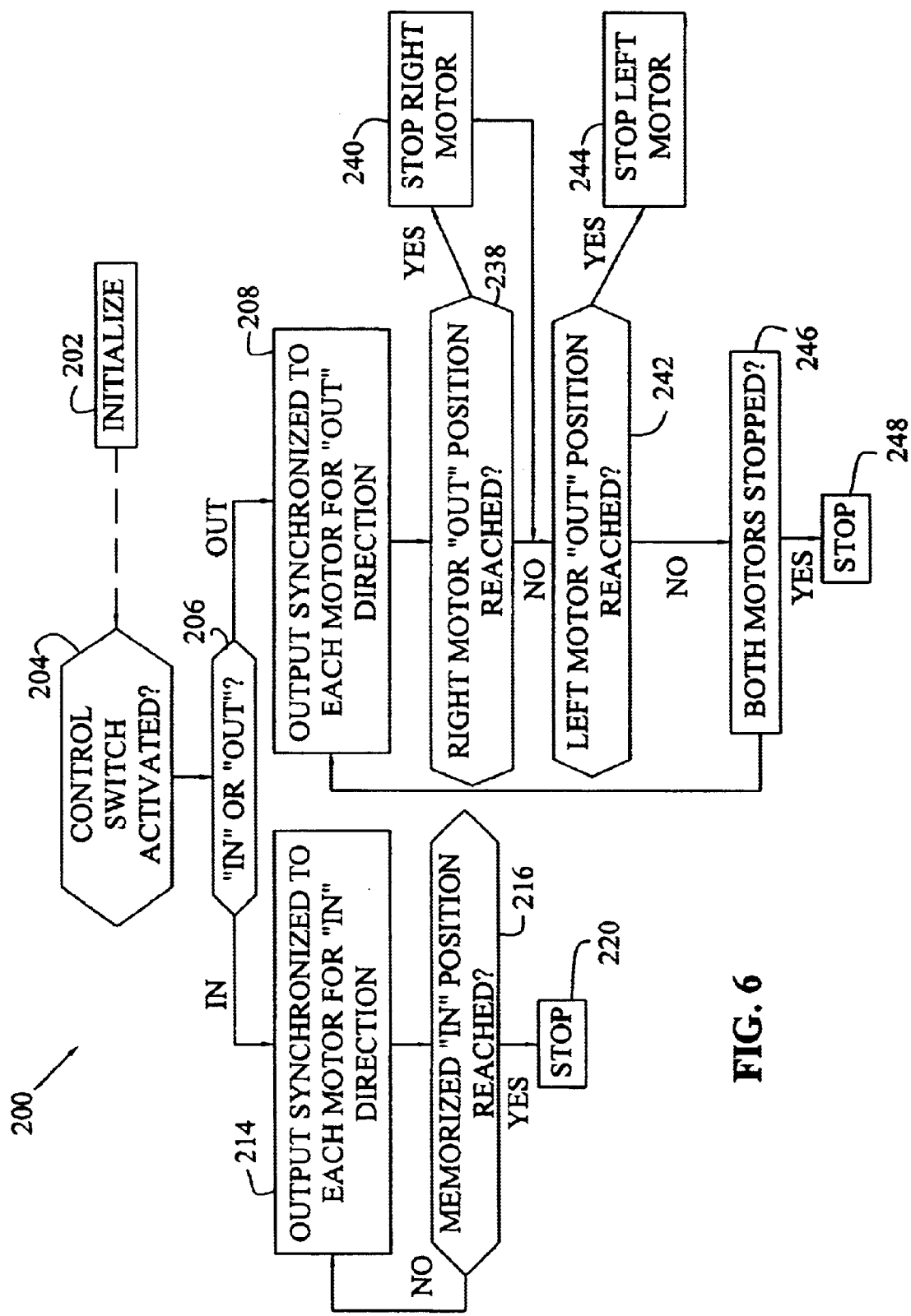
FIG. 6 is a flow diagram of the operation of another embodiment of the present invention.
Figure 7:
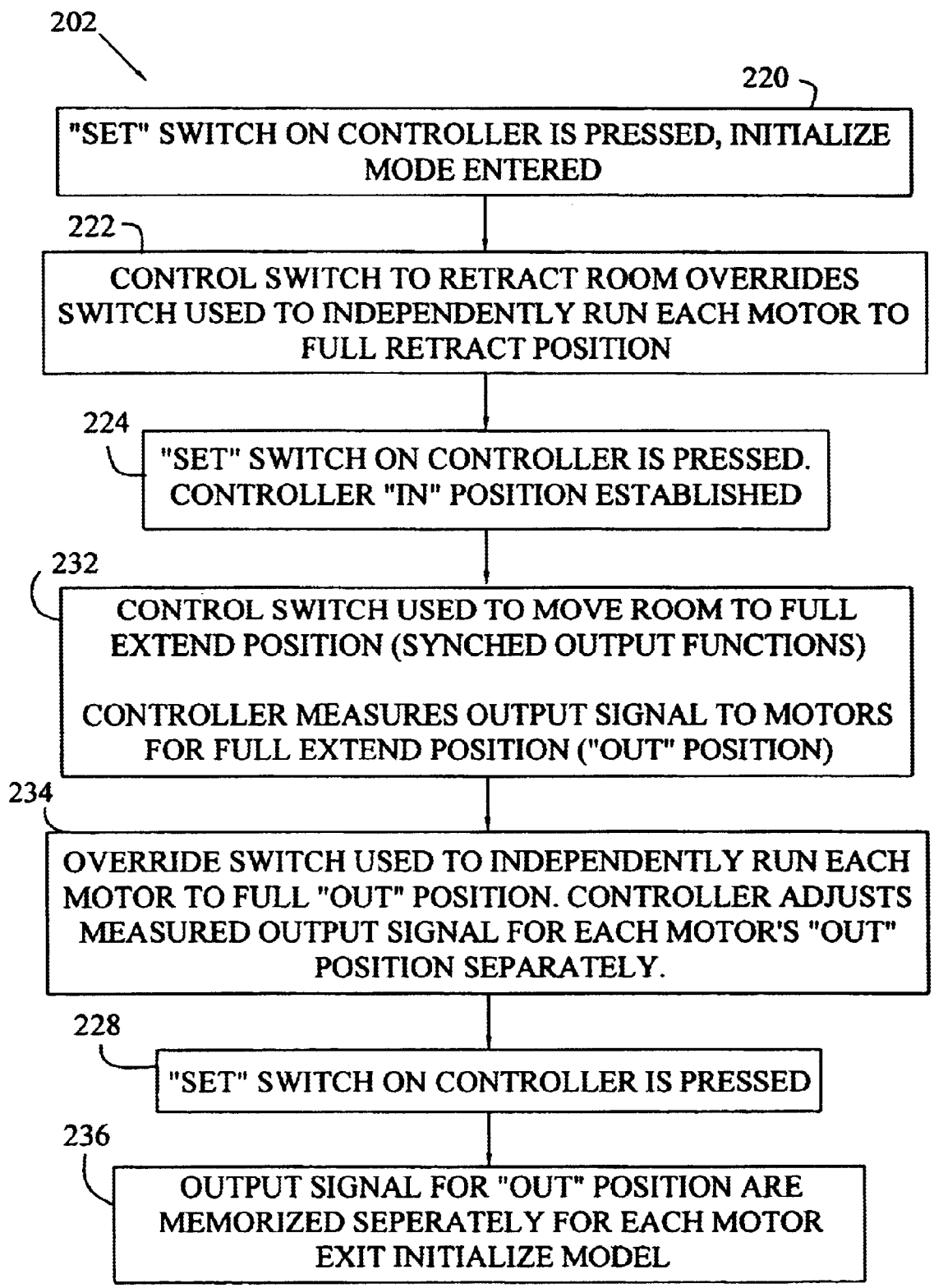
FIG. 7 is a flow diagram of an initialization procedure for the embodiment of FIG. 6.

The above-described system 100 may be described as a two-point stop system because the memorized "in" position is a single set of data which relates to both extendable members 44, 46 and the memorized "out" position is a single set of data which relates to both members 44, 46. FIGS. 6 and 7 correspond to a three-point stop system 200 wherein the memorized "in" position is common to both extendable members 44, 46, but the "out" position of each member 44, 46 is set and reached independently. Referring to FIG. 7, three-point stop system 200 is initialized by entering the initialization mode using set switch 94, moving room 32 to the retracted position using control switch 82, adjusting the position of each extendable member 44, 46 while in the retracted position using a combination of control switch 82 and override switches 90, 92, and tapping set switch 94 a second time to store or memorize the initial conditions corresponding to the retracted position as indicated by blocks 220, 222, and 224. This portion of the initialization procedure is identical to that described with reference to FIG. 5. Accordingly, the reference designations of FIG. 5 have been retained, but are incremented by 100.

Next, the technician uses control switch 82 to move room 32 toward the extended position. The synchronization provided by controller 74 may occur during this extension as described above. When room 32 is near the extended position, the technician releases control switch 82 if a momentary contact switch is used (or again actuates control switch 82 if a maintained contact switch is used) to stop movement of room 32 as indicated by block 232. Controller 74 measures the output provided to motors 56, 58 to reach this position. As indicated by block 234, the technician then individually adjusts the position of each extendable member 44, 46 using a combination of control switch 82 and override switches 90, 92 to achieve a desired extended position. For example, when room 32 is almost fully extended, the inner seal adjacent the left hand side of room 32 may be tight, but a gap may still exist adjacent the right hand side of room 32. Accordingly, the technician may further extend right extendable member 46 using control switch 82 and right override switch 92 to achieve the desired seal adjacent the right hand side of room 32. During such adjustments, controller 74 monitors the output signals provided to motors 56, 58 and adjusts the overall output signal provided to each motor 56, 58 accordingly. After room 32 is positioned in this manner into the desired extended position, the technician actuates set switch 94 (as indicated by block 228), and controller 74 stores or memorizes the motor control data corresponding to the individual left "out" and right "out" positions of extendable members 44, 46 as indicated by block 236. Finally, controller 74 exits the initialization mode.

Referring now to FIG. 6, once initialized in the manner described above, system 200 operates as follows. If room 32 is extended from vehicle 10, the operator may retract room 32 by actuating control switch 82. Controller 74 detects activation of control switch 82 at block 204, and determines that "in" terminal 84 of control switch 82 is active at block 206. As indicated by blocks 214, 216, and 220, controller 74 then provides synchronized output signals to motors 56, 58 such that the motors move in unison until the output signal provided corresponds to the predetermined "in" position, whereupon controller 74 stops.

When the operator extends room 32, controller 74 again detects actuation of control switch 82 and determines that the "out" direction was selected. At block 208, controller 74 provides synchronized output signals to motors 56, 58 to move room 32 to the extended position. At block 238, controller 74 compares the output signal provided to motor 58 with the stored data corresponding to the right "out" position resulting from the initialization procedure described above. If the right "out" position is reached as indicated by the total output signal provided to motor 58, controller 74 stops right motor 58 as indicated by block 240. If the right "out" position is not yet reached, controller 74 compares the total output signal provided to motor 56 to the stored data corresponding to the left "out" position as indicated by block 242. If the total output signal provided to motor 56 equals the total output signal previously measured during the initialization procedure corresponding to the left "out" position, then controller 74 stops operation of left motor 56 as indicated by block 244. If, for example, left motor 56 is stopped, but right motor 58 has not yet reached the right "stop" position, the answer to decision block 246 will be "no," and controller 74 will continue to operate right motor 58 and compare the output signal provided to right motor 58 to the stored data corresponding to the right "out" position until both motors are stopped and operation of system 200 is discontinued at block 248.

As should be apparent from the foregoing, when room 32 is next moved from the extended position to the retracted position, controller 74 first operates whichever motor 56, 58 corresponds to the extendable member 44, 46 which was extended farthest to reach its "out" stop position. For example, if left motor 56 was stopped first during the extension described above, and right motor 58 was extended an additional twenty counts to its "out" stop position, then controller 74 will first operate motor 58 for twenty counts in the "in" direction during the next retraction. After accounting for this difference in "out" stop positions, controller 74 provides synchronized output signals to motors 56, 58 in the manner described above.

As should also be apparent from the foregoing, controller 74 stops motors 56, 58 automatically, without feedback from motors 56, 58 or extendable members 44, 46, and without further input from the operator. Accordingly, control switch 82 does not have to be a momentary contact switch that the operator continues to hold until room 32 reaches the extended or retracted position. Instead, control switch 82 could include a one-touch operation feature wherein the operator simply toggles control switch 82 once in the "out" or "in" direction and leaves the switch unattended. Obviously, it is well within the ability of one skilled in the art to replace any of the switches described herein with buttons or other electromechanical devices.

Figure 8:
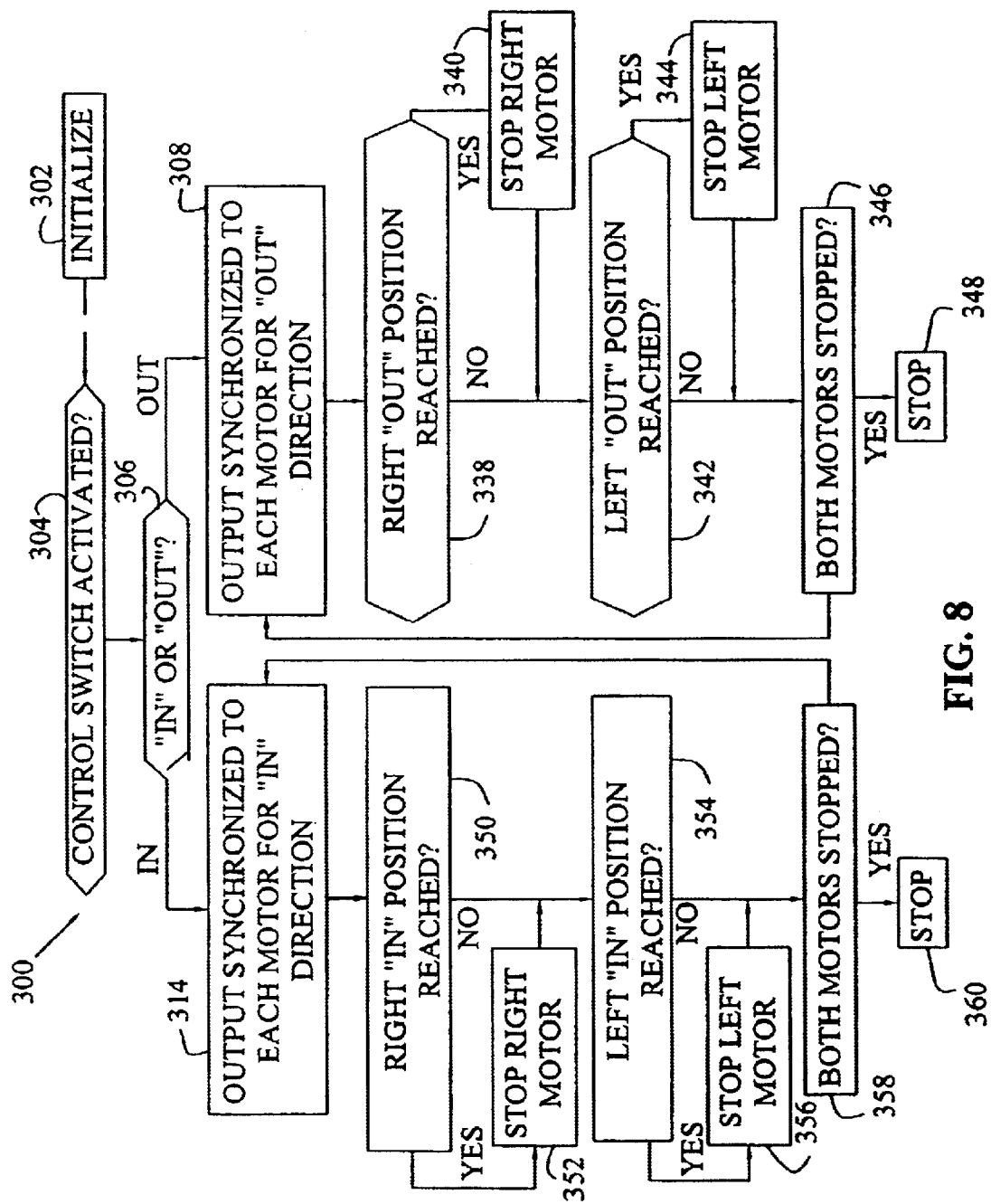
FIG. 8 is a flow diagram of the operation of another embodiment of the present invention.
Figure 9:
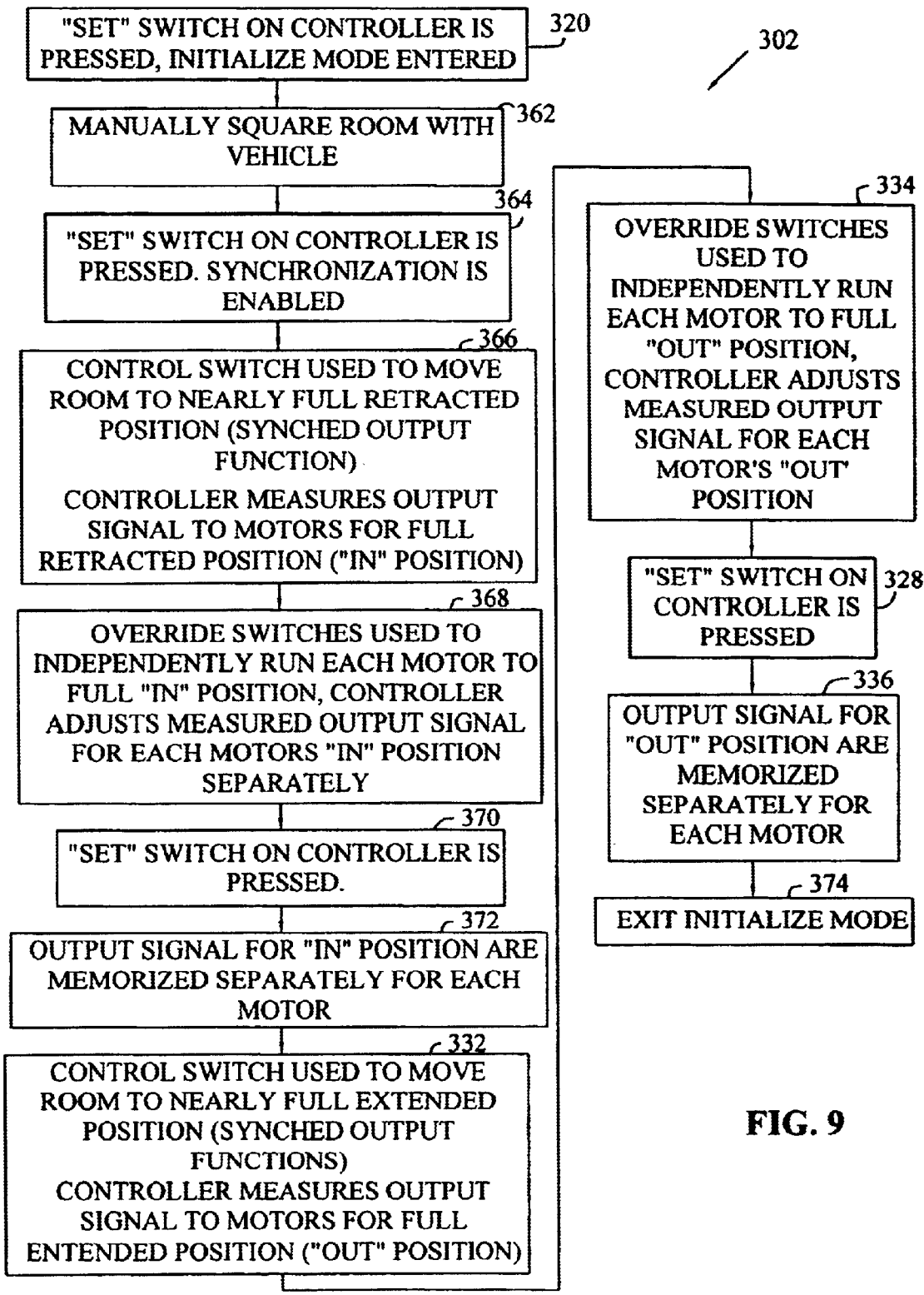
FIG. 9 is a flow diagram of an initialization procedure for the embodiment of FIG. 8.

FIGS. 8 and 9 depict the operation and initialization procedure for a four-point stop system 300. In this embodiment, individual left and right "in" stop positions and individual left and right "out" stop positions are set and used by controller 74 to automatically stop the left and right sides of room 32 in predetermined stop positions. The initialization procedure of FIG. 9 is entered by actuating set switch 94 as indicated by block 320. In this embodiment, the technician or service person aligns room 32 such that it is square or parallel to vehicle side wall 12 by manually positioning room 32 as indicated by block 362. For example, room 32 may be slightly extended from vehicle side wall 12 during installation, and the service person may disconnect the brakes associated with motors 56, 58 or disconnect the motor drive connection to permit manual adjustments to the positions of extendable members 44, 46. The service person may use a tape measure to position the left and right sides of room 32 such that they are equally spaced from vehicle side wall 12. After room 32 is so positioned, set switch 94 is again actuated (block 364), prompting controller 74 to store the initial, relative operating parameters of motors 56, 58. For example, the initial "zero" count position of motors 56, 58 may be stored if stepper motors are used. After this step is accomplished, controller 74 will provide appropriate output signals to motors 56, 58 to ensure that this relative positioning of extendable members 44, 46 is maintained during extension and retraction of motors 56, 58.

The technician next actuates control switch 82 to move room 32 near the retracted position as indicated by block 366. Controller 74 measures the output signals provided to motors 56, 58 during retraction of room 32. The precise positioning of room 32 is then controlled by the technician using control switch 82 and override switches 90, 92 as indicated by block 368. Controller 74 again monitors the output signals provided to motors 56, 58 during these adjustments. When each side of room 32 is moved to the desired retracted position, wherein seals 71, 72 are properly compressed between back wall 34 and vehicle side wall 12, the technician again taps set switch 94 and the individual "in" position data corresponding to each motor 56, 58 are stored or memorized by controller 74 as indicated by blocks 370, 372.

With the "in" positions set as described above, the "out" positions of motors 56, 58 are set according to the procedure described with reference to FIG. 7. Blocks 332, 334, 328, and 336 are identical to blocks 232, 234, 228, and 236, respectively, of FIG. 7, but are incremented by 100. The initialization mode is exited at block 374 of FIG. 9.

It should be apparent from a comparison of FIG. 6 to FIG. 8, that the steps depicted in FIG. 8 of activating system 300 and operating system 300 in the "out" direction are identical to those associated with system 200 of FIG. 6. Accordingly, the reference designations for common blocks have been retained, but incremented by 100.

System 300, however, also controls extendable members 44, 46 to individual "in" stop positions as described above. When the operator actuates control switch 82 in the "in" direction, controller 74 first accounts for any difference in "out" stop positions between extendable members 44, 46 by operating an appropriate motor 56, 58 in the "in" direction until the relationship between motors 56, 58 corresponds to the initial relationship established during the initialization procedure described above. Next, controller 74 provides synchronized output signals to motors 56, 58 such that motors 56, 58 move extendable members 44, 46 in unison toward the retracted position as indicated by block 314. Controller 74 measures the output signals provided to motors 56, 58 and compares the measurements (current reversals, counts, value, level, duration, etc.) to the previously stored data corresponding to the right "in" position and the left "in" position established during the initialization procedure described above. When the output signal provided to either motor 56, 58 equals the memorized "in" stop position associated with that motor 56, 58, controller 74 stops outputting a signal to that motor 56, 58, but continues operating the other motor 56, 58. Eventually, both motors reach their "in" stop positions and operation of controller 74 stops. The above-described procedure for synchronizing movement of extendable members 44, 46 and automatically stopping members 44, 46 at "in" stop positions (indicated by blocks 314, 350, 352, 354, 356, 358, 360) corresponds identically, except for direction, to the procedure for extending room 32 described above with reference to FIG. 6. When room 32 is moved out of the retracted position, controller 74 first operates the last motor 56, 58 operated during retraction to account for any difference in "in" stop positions between the two motors 56, 58 in the manner described above with reference to the extension operation.

The embodiments described above provide open-loop synchronization of extendable members 44, 46 by controlling motors 56, 58, respectively, and open-loop stopping at "in" and "out" stop positions established during an initialization procedure. The open-loop synchronization concept of the present invention, however, may also be applied to systems wherein a device provides feedback to controller 74 (or the operator) indicating that a stop position has been reached. A variety of devices may be used including, mechanical stops such as bolts connected to extendable members 44, 46 which prevent extension and retraction of members 44, 46 beyond a stop position. The stop positions provided by mechanical stops are the positions at which actual mechanical interference between bolts, for example, and a corresponding stop surface on inner tubes 52, 54 or outer tubes 48, 50. The feedback provided by mechanical stops directly results in discontinued movement of extendable members 44, 46.

Similarly, limit switches or position sensors may also be employed to provide feedback to controller 74 indicating that a desired stop position has been reached. Such switches or sensors may be mounted in any of a variety of locations such as on back wall 34, vehicle side wall 12, inner tubes 52, 54, or outer tubes 48, 50. When room 32 or an extendable member 44, 46 reaches a desired stop position, contact or proximity of some portion of one of the above-listed components with a limit switch or position sensor produces a feedback signal to controller 74 which stops movement of one or both extendable members 44, 46 in response thereto.

Mechanical stops, limit switches, and position sensors establish a stop position by being positioned at a particular location on one of the system components, on room 32, or on vehicle 10. When such devices are used, the stop positions of the system may be adjusted by changing the position of the device. Other types of devices may be used to establish stop positions which do not require precise positioning of the device. For example, motors 56, 58 may be provided with clutches which slip when the resistance of room 32 (or an extendable member 44, 46) to further movement exceeds a threshold. Additionally, circuit breakers or over-current detection devices may be connected to motors 56, 58 to detect the current draw of motors 56, 58. As is well known in the art, when motor output torque increases, such as when an extendable member 44, 46 is in a fully extended position, the motor draws more current. When the current draw increases beyond the trip point of the circuit breaker or over-current detector, the circuit breaker will trip and disable the motor (or motors) or the over-current detector will trip and disable the motors or provide a feedback signal to controller 74 which disables the motors. The trip point of some over-current detectors is adjustable. By adjusting the trip point, the operator may adjust the amount of force applied by motors 56, 58 to extendable members 44, 46, respectively, before the over-current detector and controller 74 disable motors 56, 58. This feature thus permits adjustment to the tightness of the seals between room 32 and vehicle side wall 12 when room 32 is in the extended or retracted position.

Figure 10:
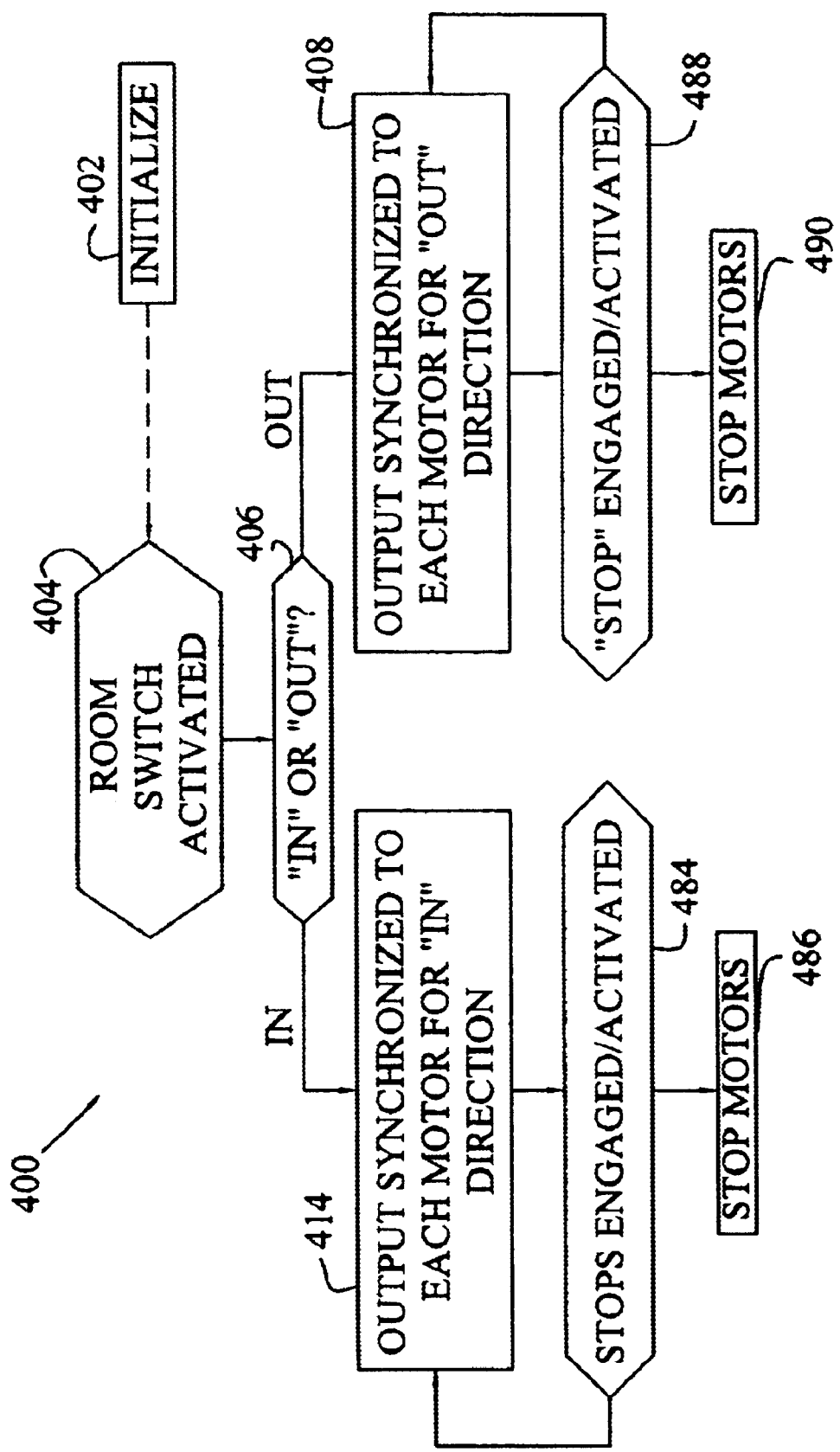
FIG. 10 is a flow diagram of the operation of another embodiment of the present invention.
Figure 11:
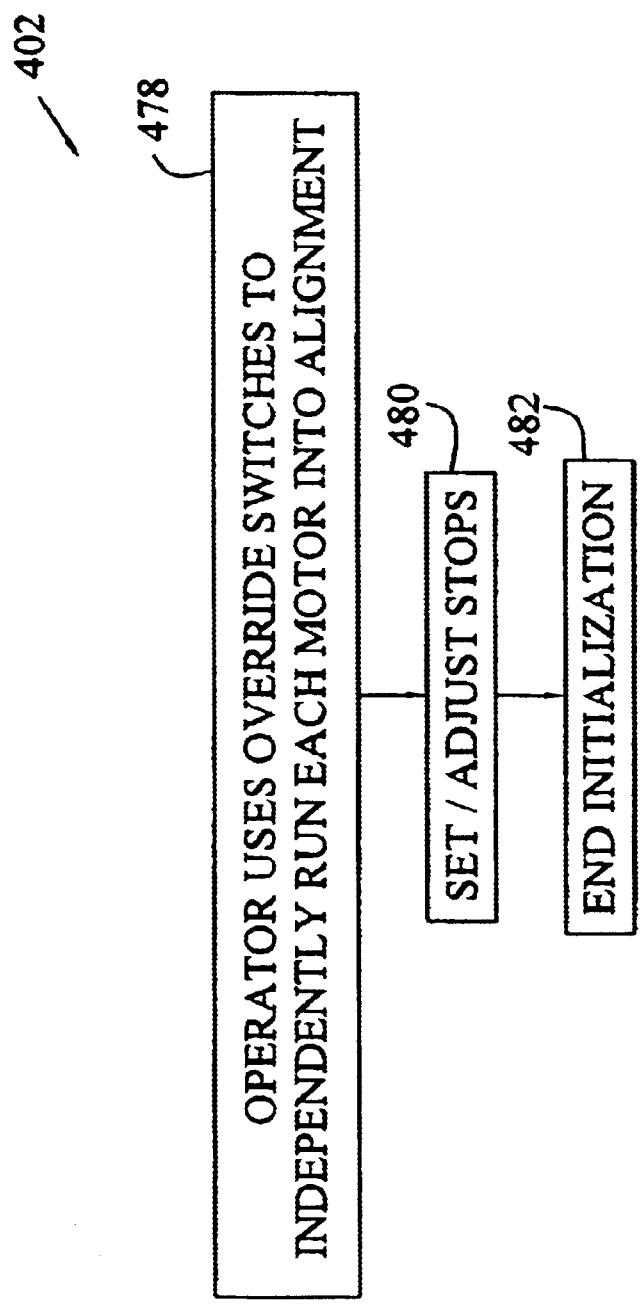
FIG. 11 is a flow diagram of an initialization procedure for the embodiment of FIG. 10.

FIGS. 10 and 11 depict the operation and initialization of a system 400 which provides open-loop synchronized operation of motors 56, 58 with closed-loop stop devices such as those described above. Referring to FIG. 11, the service person installing room 32 may use override switches 90, 92 to operate motors 56, 58 independently to align room 32 with vehicle side wall 12 as indicated by block 478. For example, room 32 may be positioned in the retracted position such that back wall 34 is parallel to vehicle side wall 12 and seals 71, 72 are fully compressed. The service person then taps set switch 94 at block 480 to cause controller 74 to store data representing the initial conditions of motors 56, 58. Controller 74 maintains the relative positions of motors 56, 58 (and therefore extendable members 44, 46) during movement of extendable members 44, 46 by providing synchronized output signals to motors 56, 58 as described above.

When in the retracted position, for example, the service person may adjust the location of mechanical stops or limit switches to correspond to the desired retracted position. A similar procedure is followed for setting the "out" stop positions. If circuit breakers are used as stop feedback devices, no adjustments are necessary. If over-current detectors or clutches are used, the service person may adjust the trip point of the detectors or adjust the tightness of the clutches to ensure a tight seal on both sides of room 32 when in both the retracted and extended positions as described above. After adjustments, if any, are made to the stop devices, the initialization procedure is complete as indicated by block 482.

Referring now to FIG. 10, the operator may move room 32 to the retracted position by actuating control switch 82 as described above and indicated at blocks 404, 406. As indicated by block 414, controller 74 then provides synchronized output signals to motors 56, 58 such that motors 56, 58 move in unison without feedback according to the principles of the present invention. At block 484, room 32 reaches the retracted position. If mechanical stops are used as feedback devices, the operator hears a variation in the sounds associated with motors 56, 58 and stops motors 56, 58 at block 486 by, for example, moving control switch 82 to the neutral position. Similarly, if motor clutches are used, the operator hears slippage of the clutches and disables motors 56, 58. If, on the other hand, limit switches, position sensors, circuit breakers, or over-current detectors are employed, feedback signals are automatically provided to controller 74 or motors 56, 58 to stop motor operation. As should be apparent from the figure, operation of system 400 in the "out" direction is identical.

One feature of system 400 which may not be immediately apparent is automatic realignment. For example, if an object is pinched between the right side inner fascia of room 32 during extension of room 32, extendable member 46 may not fully extend to the desired position due to the interference of the pinched object, resulting in an offset between the left and right sides of room 32. This offset is maintained by controller 74 during retraction of room 32, and right extendable member 46 will reach its associated stop device before left extendable member 44. However, controller 74 will continue to operate motor 56 until extendable member 44 has reached its "in" stop position as indicated by the feedback device associated with left extendable member 44. Thus, the offset between extendable members 44, 46 caused by the pinched object is no longer present and system 400 is realigned.

When open-loop stops are used wherein the "in" and "out" stop positions are stored in controller 74 as described above, a certain degree of realignment also occurs. For example, if an object prevents full extension of the right side of room 32 as described above, an offset between the sides of room 32 may occur because controller 74 "believes" it has caused right motor 58 to operate such that right extendable member 46 is in its "out" stop position. When controller 74 operates motors 56, 58 during a subsequent retraction operation, controller 74 may operate motor 58 beyond the amount actually required for motor 58 to reach its "in" stop position. However, since back wall 34 will engage vehicle side wall 12 to prevent further inward travel of extendable member 46 at a position approximately equal to the "in" stop position, the system becomes at least partially realigned.

Although the present invention has been shown and described in detail, the same is to be taken by way of example only and not by way of limitation. Numerous changes can be made to the embodiments described above without departing from the scope of the invention. For example, one skilled in the art could readily adapt the teachings of the present invention to a system using feedback for synchronization such as is described in the patent application incorporated herein by reference. In such a system, only the stop positions would be predetermined and memorized such that controller 74 stops operation of motors 56, 58 when the output signals provided to motors 56, 58 equal the stored data corresponding to the stop positions of extendable members 44, 46. Thus, open-loop synchronization with open-loop stops, open-loop synchronization with closed-loop stops (i.e., stop devices which provide feedback), and closed-loop synchronization with open-loop stops are all considered well within the scope of the present invention. Additionally, one skilled in the art could readily combine open-loop stops with closed-loop stops as a back-up stop mechanism. For example, during normal operation, the system stop positions would correspond to the stored data in controller 74. If, however, an object interfered with movement of one of extendable members 44, 46, an overcurrent sensor, for example, could provide feedback to controller 74 to stop operation of the system.

What is claimed is:

1. An open-loop synchronization system for synchronizing the movement of a slide out room of a recreational vehicle during extension and retraction of the room, the system comprising extendable support members for supporting the slide out room between the extended and retracted positions, drive motors having known output characteristics depending upon motor input, a linkage mechanism intermediate said drive motors and said extendable support members, and a controller for providing synchronized output signals to the motors to cause synchronized movement of the motors, whereby said motor output provides synchronized movement of the extendable members.

2. The open-loop synchronization system of claim 1, wherein said controller has stored stop positions for fully extended and fully retracted positions.

3. The open-loop synchronization system of claim 2, wherein said controller measures the output signals provided to the motors during extension and retraction and compares the overall output signals to the stored data corresponding to the stop positions, such that when the overall output signals equal the stored data, the controller stops one or both of the motors.

4. An open-loop synchronization system for synchronizing the movement of a slide out room of a recreational vehicle during extension and retraction of the room, the system including a first and a second extendable support member for supporting the slide out room between a retracted position and an extended position, a first and a second drive motor, a means connecting said first motor to said first extendable support member and connecting said second motor to said second extendable support member for allowing said motors to create movement in the corresponding said extendable support, and a controller providing output signals to said motors whereby said extendable supports move in a synchronized manner.

5. The open-loop synchronization system as set forth in claim 4 wherein said means connecting said motors to said extendable support members comprising a plurality of gear boxes.

6. The open-loop synchronization system as set forth in claim 4 wherein said controller provides output signals to said motors and said motors move said extendable support members in response.

7. The open-loop synchronization system as set forth in claim 4 wherein said motors include a brake to avoid drift in said slide out room during extension or retraction.

8. The open-loop synchronization system as set forth in claim 4 wherein said controller includes stored stop positions indicating said extended position and said retracted position.

9. The open-loop synchronization system as set forth in claim 8 wherein said controller measures the output signals provided to the motors during extension and retraction and compares the output signals to the stored data corresponding to the stop positions, such that when the overall output signals equal the stored data, the controller stops one or both of the motor.

10. An open-loop synchronization system for synchronizing the movement of a slide out room of a recreational vehicle during extension and retraction of the room, the system comprising a first and a second motor, a controller for controlling the output of said motors, and a first and second extendable support member connected to said motors by way of a linkage mechanism whereby said controller provides output signals to said motor to cause synchronized movement of said motors and synchronized extension of said extendable support members without feedback from said first and said second motors.

11. The open-loop synchronization system as set forth in claim 10 wherein said linkage mechanism comprises a first and a second gear box.

12. The open-loop synchronization system as set forth in claim 10 wherein said controller includes stored stop positions corresponding to an extended position and a collapsed position for stopping said motors when the room reaches said fully extended and said fully retracted positions.

13. The open-loop synchronization as set forth in claim 10 wherein said controller stops one of said first or said second motor when said slide out room drifts.

* * * * *